US012603694B2

(12) United States Patent
Gulati et al.

(10) Patent No.: US 12,603,694 B2
(45) Date of Patent: Apr. 14, 2026

(54) COMPRESSED CHANNEL STATE INFORMATION TRANSFER

(71) Applicant: Nokia Solutions and Networks Oy, Espoo (FI)

(72) Inventors: Shalini Gulati, Bangalor (IN); Suresh Kalyanasundaram, Bangalore (IN); Jinesh P. Nair, Bangalore (IN); Shuang Tan, Beijing (CN); Stefan Wesemann, Kornwestheim (DE)

(73) Assignee: Nokia Solutions and Networks Oy, Espoo (FI)

( * ) Notice: Subject to any disclaimer, the term of this patent is extended or adjusted under 35 U.S.C. 154(b) by 704 days.

(21) Appl. No.: 17/761,736

(22) PCT Filed: Sep. 20, 2019

(86) PCT No.: PCT/CN2019/107123
§ 371 (c)(1),
(2) Date: Mar. 18, 2022

(87) PCT Pub. No.: WO2021/051417
PCT Pub. Date: Mar. 25, 2021

(65) Prior Publication Data
US 2022/0385352 A1      Dec. 1, 2022

(51) Int. Cl.
H04B 7/08      (2006.01)
H04W 28/06      (2009.01)

(52) U.S. Cl.
CPC ............ H04B 7/088 (2013.01); H04W 28/06 (2013.01)

(58) Field of Classification Search
CPC ........ H04B 7/088; H04B 7/022; H04B 7/063; H04B 7/0456; H04B 7/06; H04B 7/0478;
(Continued)

(56) References Cited

U.S. PATENT DOCUMENTS

| | | | | |
|---|---|---|---|---|
| 10,211,906 B1 * | 2/2019 | Nam | ..................... | H04B 7/0478 |
| 2011/0293032 A1 * | 12/2011 | Azenkot | ............. | H04L 27/2695 |
| | | | | 327/156 |

(Continued)

FOREIGN PATENT DOCUMENTS

| | | |
|---|---|---|
| CN | 1100348003 A | 7/2019 |
| CN | 110169114 A | 8/2019 |
| WO | WO 2020/135244 A1 | 7/2020 |

OTHER PUBLICATIONS

International Search Report in International Application No. PCT/CN2019/107123 mailed Jun. 24, 2020.
(Continued)

*Primary Examiner* — Ricky Q Ngo
*Assistant Examiner* — David M Kayal
(74) *Attorney, Agent, or Firm* — Lippes Mathias LLP

(57)      ABSTRACT

Embodiments of the present disclosure relate to compressed channel state information transfer. According to embodiments of the present disclosure, the radio unit at the base station receives signals from the terminal device. The radio unit (RU) compresses the signal based on the weights of beams and transmits the compressed signal to the baseband unit (BBU) at the base station. The baseband unit reconstructs the channel based on the compressed signal and the coefficients. In this way, the amount of information conveyed across the RU-BBU interface is reduced, and the accuracy of channel estimation is improved. Further, the sounding reference signal (SRS) channel can be obtained at the BBU with reduced number of SRS transmissions.

22 Claims, 14 Drawing Sheets

(58) Field of Classification Search
 CPC .. H04B 7/0479; H04B 7/0617; H04B 7/0619;
 H04B 7/0626; H04B 7/0623; H04B
 7/061; H04B 7/0417; H04B 7/0634;
 H04W 28/06; H04W 72/0453; H04W
 24/10
 See application file for complete search history.

(56) References Cited

U.S. PATENT DOCUMENTS

| | | | | |
|---|---|---|---|---|
| 2016/0142117 | A1* | 5/2016 | Rahman | H04B 7/0486 |
| | | | | 375/267 |
| 2017/0006539 | A1* | 1/2017 | Kakishima | H04W 36/08 |
| 2017/0078004 | A1* | 3/2017 | Capar | H04B 7/0686 |
| 2019/0199379 | A1 | 6/2019 | Österling et al. | |
| 2020/0228178 | A1* | 7/2020 | Mittal | H04B 7/0663 |
| 2021/0376887 | A1* | 12/2021 | Wu | H04B 7/0639 |
| 2022/0029675 | A1* | 1/2022 | Huang | H04B 7/0695 |
| 2022/0069880 | A1* | 3/2022 | Rahman | H04B 7/0695 |
| 2023/0421226 | A1* | 12/2023 | Li | H04L 1/0026 |

OTHER PUBLICATIONS

Samsung: "CSI enhancement for MU-MIMO", 3GPP TSG RAN WG1 Meeting #95, R1-1813001 Nov. 16, 2018 (Nov. 16, 2018), pp. 1-5.

Samsung: "CSI enhancement for MU-MIMO", 3GPP TSG RAN WG1 Meeting #94b, R1-1810884 Oct. 12, 2018 (Oct. 12, 2018), pp. 1-6.

Huawei et al: "Discussion on UE complexity of DFT-based compression codebook", 3GPP TSG RAN WG1 Meeting #97, R1-1906032 May 17, 2019 (May 17, 2019), pp. 1-6.

Ericsson: "Frequency-parametrization for Type II CSI codebook", 3GPP TSG RAN WG1 Meeting #92, R1-1802748 Mar. 2, 2018 (Mar. 2, 2018), pp. 1-8.

* cited by examiner

100

120

110-1

110-2

110-N

. . .

$N_v$ $N_h$

400

410

RECEIVE THE SIGNAL ON A CHANNEL BETWEEN
THE FIRST DEVICE AND THE SECOND DEVICE

420

SELECT THE ONE OR MORE BEAMS

430

COMPRESS THE SIGNAL

440

CAUSE THE CHANNEL ESTIMATION TO BE
PERFORMED ON THE COMPRESSED SIGNAL BASED
ON THE COEFFICIENTS

500

510

RECEIVE THE COMPRESSED SIGNAL

520

DECOMPRESS THE SIGNAL

530

DETERMINE THE CHANNEL ESTIMATION OF THE
CHANNEL

1300

COMPRESSED CHANNEL STATE INFORMATION TRANSFER

FIELD

Embodiments of the present disclosure generally relate to the field of communications and in particular, to a method, device, apparatus and computer readable storage medium for compressed channel state information transfer.

BACKGROUND

With development of technologies, different types of communications have been proposed. In order to improve communication quality, the channel between the network device and the terminal device needs to be estimated. However, the bandwidth between the radio unit (RU) and the baseband unit (BBU) of a device may be limited. Thus, reducing the amount of data to be transported without losing information is highly desirable.

SUMMARY

Generally, embodiments of the present disclosure relate to a method for channel estimation and corresponding devices.

In a first aspect, there is provided a radio unit. The radio unit comprises at least one processor; and at least one memory including computer program codes; the at least one memory and the computer program codes are configured to, with the at least one processor, cause the radio unit to: receive a signal on a channel between a first device and a second device. The radio unit is in the first device. The radio unit is caused to select one or more beams from a set of beams associated with the channel in accordance with coefficients of beams, the coefficients indicating importance of the beams and being used for combining the selected one or more beams. The radio unit is further caused to compress the signal based on the coefficients for combining beams. The radio unit is also caused to cause a channel estimation to be performed on the compressed signal based on the coefficients.

In a second aspect, there is provided a baseband unit. The baseband unit comprises at least one processor; and at least one memory including computer program codes; the at least one memory and the computer program codes are configured to, with the at least one processor, cause the baseband unit to: receive, from a radio unit in the first device, a compressed signal and indices of one or more beams, the compressed signal being obtained from a signal received on a channel between the first device and a second further device, the one or more beams associated with the channel. The baseband unit is also caused to decompress the compressed signal based on coefficient for combining the one or more beams, the coefficients indicating importance of the one or more beams. The baseband unit is also caused to determine a channel estimation of the channel between the first device and the second device based on the signal.

In a third aspect, there is provided a method. The method comprises receiving, at a radio unit, a signal on a channel between a first device and a second device. The radio unit is in the first device. The method also comprises selecting one or more beams from a set of beams associated with the channel in accordance with coefficients of beams, the coefficients indicating importance of the beams and being used for combining the selected one or more beams. The method further comprises compressing the signal based on the coefficients. The method yet comprises causing a channel estimation to be performed on the compressed signal based on the coefficients.

In a fourth aspect, there is provided a method. The method comprises receiving, at a baseband unit in a first device and from a radio unit in the first device, a compressed signal and indices of one or more beams, the compressed signal being obtained from a signal received on a channel between the first device and a second further device, the one or more beams associated with the channel. The method also comprises decompressing the compressed signal based on coefficient for combining the one or more beams, the coefficients indicating importance of the one or more beams. The method further comprises determining a channel estimation of the channel between the first device and the second device based on the signal.

In a fifth aspect, there is provided an apparatus comprising: means for receiving, at a radio unit, a signal on a channel between a first device and a second device, the radio unit being in the first device; means for selecting one or more beams from a set of beams associated with the channel in accordance with coefficients for combining beams, the coefficients indicating importance of the beams; means for compressing the signal based on the coefficients; and means for causing a channel estimation to be performed on the compressed signal based on the coefficients.

In a sixth aspect, there is provided an apparatus comprising means for receiving, at a baseband unit in a first device and from a radio unit in the first device, a compressed signal and indices of one or more beams, the compressed signal being obtained from a signal received on a channel between the first device and a second further device, the one or more beams associated with the channel; means for decompressing the compressed signal based on coefficient for combining the one or more beams, the coefficients indicating importance of the one or more beams; and means for determining a channel estimation of the channel between the first device and the second device based on the signal.

In a seventh aspect, there is provided a non-transitory computer readable medium comprising program instructions for causing an apparatus to perform at least the method according to the second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
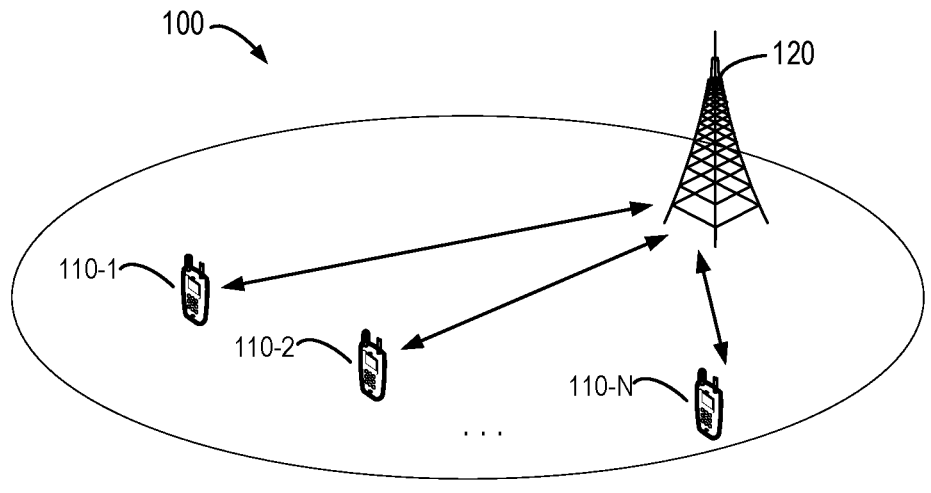
FIG. 1 illustrates a schematic diagram of a communication system according to embodiments of the present disclosure.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
(a) hardware-only circuit implementations (such as implementations in only analog and/or digital circuitry) and (b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a user equipment and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a user equipment accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As mentioned above, the bandwidth between the RU and the BBU may be limited. For eigen beam-forming (EBF) computation, spatial channel covariance is needed at the base-band unit (BBU). In the conventional approach, raw sounding reference signal (SRS) Channel are transferred from the RU to the BBU. To deal with the limited bandwidth between the RU and the BBU, two approaches are followed here.

The first approach is the delay managed scenario. In this approach, the SRS channel is not buffered in the RU. Although it is simpler in hardware complexity, it needs multiple SRS transmissions. This is undesirable as this would impact the spectral efficiency of the system as this needs to be done on a per-user basis.

In the second approach, the data buffering (non-delay managed) is carried out at the RU. In this case, the complexity of the system is increased as buffering is employed at the RU. However, it is comparatively spectrally efficient.

The eigen beam-forming (EBF) is computed in the BBU using the simplified independent-EBF approach (I-EBF). The spatial covariance of the horizontal (H) and vertical (V) channels is computed. In conventional technologies, one of the approaches of compressing the channel estimates is to use pre-combining of the SRS channel in the transmitting (TRX) element space in the RU. In this case, a pre-combined H channel is obtained by using a weighted sum of the vertical TRX elements in the RU. Similarly, a pre-combined V channel is obtained by using a weighted sum of the horizontal TRX elements in the RU. These are then conveyed to the BBU. In this way, the number of channel data that needs to be conveyed which is the product of the number of H and V channels is reduced (compressed) to the sum of the number of H and V channels.

Thus, it needs efficient schemes to convey the channel state from the RU to the BBU under the reduced data rate constraints between the RU-BBU interface in massive-MIMO systems. It also needs to compress the raw SRS channels to meet the data rate constraints of the RU-BBU interface without significantly losing out on the performance of the beam-forming schemes.

According to embodiments of the present disclosure, the radio unit at the base station receives signals from the terminal device. The radio unit (RU) compresses the signal based on the coefficients of beams and transmits the compressed signal to the baseband unit (BBU) at the base station. The baseband unit reconstructs the channel based on the compressed signal and the coefficients. In this way, it reduces information conveyed across the RU-BBU interface. It also improves accuracy. Further, it enables obtaining the sounding reference signal (SRS) channel at the BBU with reduced number of SRS transmissions.

Principle and embodiments of the present disclosure will be described in detail below with reference to the accompanying drawings. Reference is first made to FIG. 1, which illustrates an example communication system 100 in which embodiments of the present disclosure may be implemented.

FIG. 1 illustrates a schematic diagram of a communication system 100 in which embodiments of the present disclosure can be implemented. The communication system 100 comprises the first devices 110 and the second device 120. For the purpose of illustrations, the first device 110 may be referred to as the terminal device 110 and the second device 120 may be referred to as the network device 120 hereinafter. It should be noted that the first devices the second devices, the third devices are interchangeable. For example, the procedures which are described to be implemented at the terminal device may also be able to be implemented at the network device and the procedures which are described to be implemented at the network device may also be able to be implemented at the terminal device.

The link from the second device 120 to the first device 110 may be referred to as the "downlink" and the link from the first devices 110 to the second device 120 may be referred to as the "uplink".

The communication system 100, which is a part of a communication network, comprises terminal devices 110-1, 110-2, . . . , 110-N (collectively referred to as "terminal device(s) 110" where N is an integer number). The communication system 200 comprises one or more network devices, for example, the network device 120. The network device 120 may comprise a BBU. The term "BBU" used herein refers to a unit that processes baseband frequencies in communication systems. The network device 120 may also comprise a RU. The term "RU" used herein refers to a unit that processes radio frequencies in communication systems. The BBU and the RU are connected, for example, via an optical fiber.

It should be understood that the communication system 100 may also comprise other elements which are omitted for the purpose of clarity. It is to be understood that the numbers of terminal devices and network devices shown in FIG. 1 are given for the purpose of illustration without suggesting any limitations. The terminal devices 110 and the network device 120 may communicate with each other.

It is to be understood that the number of network devices and terminal devices is only for the purpose of illustration without suggesting any limitations. The system 100 may include any suitable number of network devices and terminal devices adapted for implementing embodiments of the present disclosure.

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Figure 2:
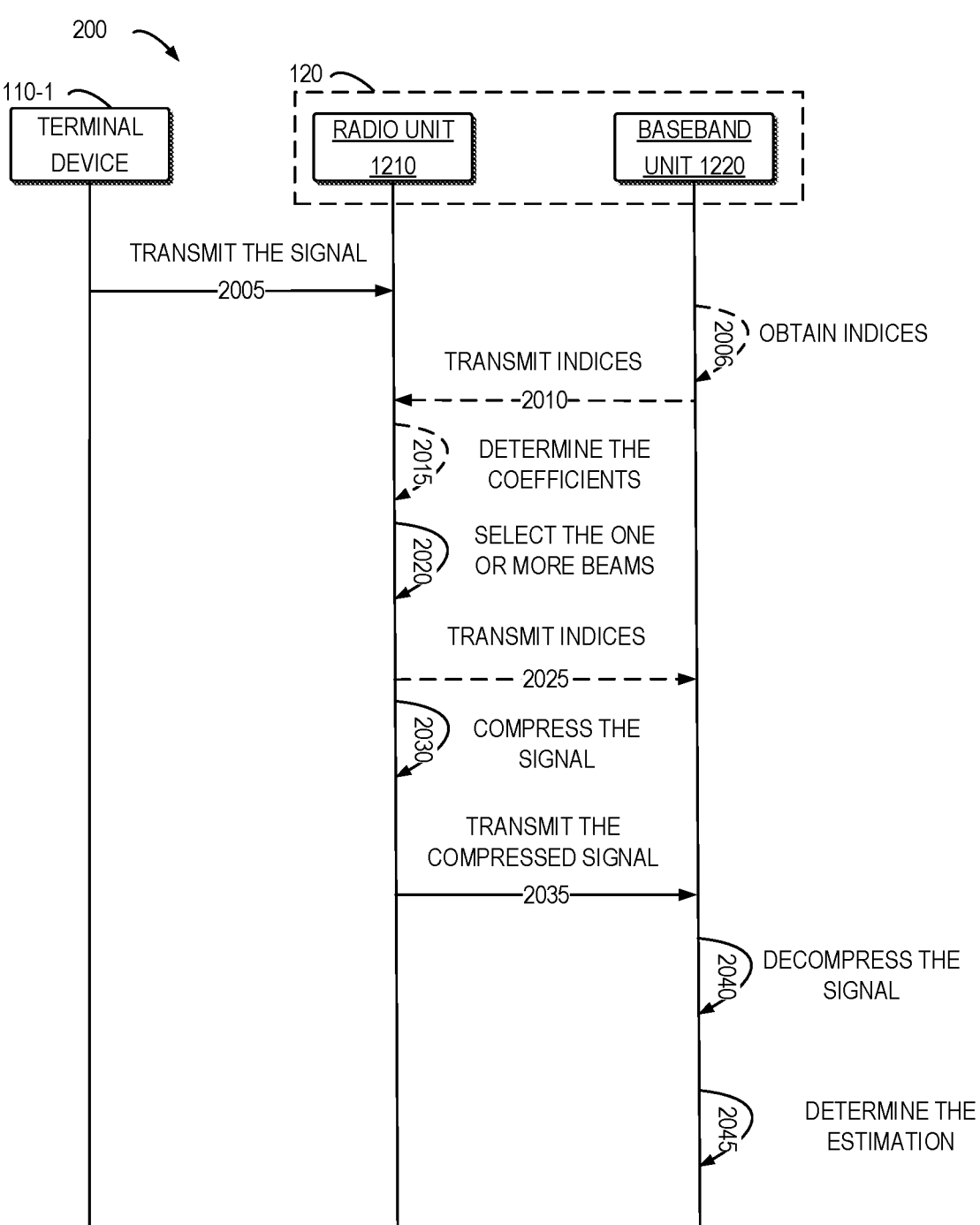
FIG. 2 illustrates a schematic diagram of interactions between devices according to embodiments of the present disclosure.

FIG. 2 illustrates a schematic diagram of interactions 200 among devices in accordance with embodiments of the present disclosure. The interactions 200 may be implemented at any suitable devices. Only for the purpose of illustrations, the interactions 200 are described to be implemented at the terminal device 110-1 and the network device 120. The network device 120 comprise the RU 1210 and the BBU 1220.

The terminal device 110-1 transmits 2005 a signal on a channel between the terminal device 110-1 and the network device 120. The channel can be expressed as a linear combination of beams or beam-weights $W_i$. The coefficients that combine the beams (or beam weights) is denoted by $\lambda_i$. The coefficient indicates the importance of one beam. For example, the channel can be expressed as below.

$$H_s = \sum_{i=0}^{N-1} \lambda_i W_i \tag{1}$$

where $N=N_v N_h$ is number of beams, where $N_h$ and $N_v$ are the number of horizontal and vertical elements respectively in the planar array. The N beams can be a set of orthogonal or non-orthogonal beams. Alternatively, the N beams can be a sub-set of orthogonal beams obtained from a set of beams comprising of many such sub-sets of beams. The sub-sets of beams are non-orthogonal to each other but orthogonal within each sub-set. $W_i$ are the N beam weights each of dim: $N\times1$, $H_s$ is the $N\times1$ channel vector capturing the fading properties of the channel. The coefficients $\lambda_i$ used in the linear combination can be expressed as:

$$\lambda_i = W_i^H H_s, i = 0, ... N - 1 \tag{2}$$

where N is number of beams, $W_i$ are the N beams weights each of dim: $N\times1$, and $H_s$ is the $N\times1$ channel.

The signal received by the RU 1210 can be expressed:

$$Y_s = H_s S + n_s \tag{3}$$

where $Y_s$ represents the received signal, $H_s$ represents properties of the channel, S represents the signal transmitted by the UE, for example a sounding reference signal (SRS) and $n_s$ represents noise on the channel. Thus, the received signal $Y_s$ is associated with the channel.

Figure 3:
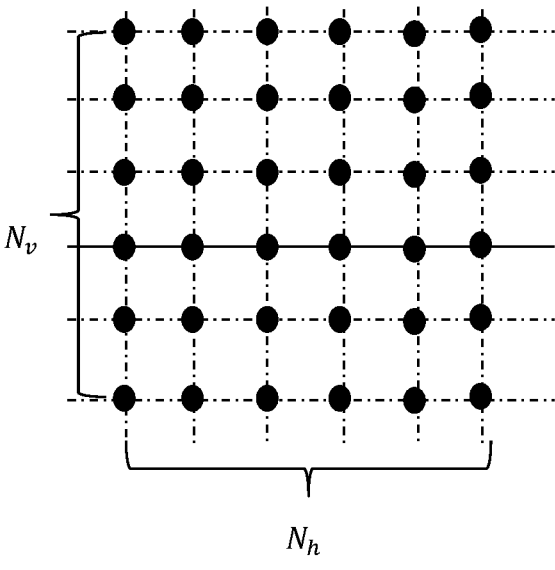
FIG. 3 illustrates a schematic diagram of horizontal and vertical channels according to embodiments of the present disclosure.

In some embodiments, the horizontal channels and the vertical channels may be pre-combined as a weighted set of beams. As shown in FIG. 3, the antenna array may be with $N_h$ horizontal antenna elements and $N_v$ vertical antenna elements. In other words, the channel can comprise a subset of vertical channels and a subset of horizontal channels. Pre-combining can be used in combination with the linear combination of beams approximation for reducing the information required to be transferred from RU to the BBU for EBF. The $i^{th}$ element of the $N_v\times1$ pre-combined vertical channel $H_v(i)$ is obtained by pre-combining the channels along the horizontal direction. This is given by:

$$H_v(i) = \sum_{i=0}^{N_h-1} A_h(j) \cdot \times H_s(iN_h + j), 0 \le i \le N_v - 1 \tag{4}$$

where $A_h(j)$ represents the $j^{th}$ element of a vector parameter used to pre-combine the channel along the horizontal direction. For example, $$A_h(j) = \frac{1}{N_h}, j = 0, ... , N_h - 1.$$

$N_h$ represents the number of horizontal antenna elements, $N_v$ represents the number of vertical antenna elements, $H_s$ represents the channel, the operation '·x' is a scalar multiplication. The $i^{th}$ element of the $N_h\times1$ pre-combined horizontal channel $H_h(i)$ is obtained by combining the channels along the horizontal direction. This is given by:

$$H_h(i) = \sum_{j=0}^{N_v-1} A_v(j) \cdot \times H_s(i + jN_h), 0 \le i \le N_h - 1 \tag{5}$$

where $A_v(i)$ represents the $j^{th}$ element of a vector parameter used to pre-combine the channel along the vertical direction. For example, $$A_v(j) = \frac{1}{N_v}, j = 0, ... , N_v - 1.$$

$N_h$ represents the number of horizontal antenna elements, $N_v$ represents the number of vertical antenna elements, $H_s$ represents the channel, the operation '·x' is a scalar multiplication.

The RU 1210 selects 2020 one or more beams from the set of beams associated with the channel. The coefficients of the selected one or more beams exceed a threshold value, which means the importance of the selected one or more beams is relatively high. Alternatively, the beams that are selected are based on the magnitude and number of the coefficients in the linear combination of beams. The one or more number of beams that need to be selected are known a-priori for example based on the bandwidth constraints between the RU and BBU. In this case, one or more beams whose associated coefficients have the higher magnitude are selected.

In some embodiments, the BBU 1220 may obtain 2006 the indices of the beams from reference information, for example, reference signal receiving power (RSRP) information. The BBU 1220 may transmit 2010 the indices to the RU 1210. The RU 1210 may select 2020 the one or more beams based on the indices and compute the coefficients $\lambda_i$ for those beam indices.

Alternatively or in addition, the RU 1210 may determine 2015 the coefficients of the beam in the set of beams. If the magnitude of the coefficients exceeds a threshold value, the RU select the beams. Alternatively the RU selects a number of beams that have the highest value of the coefficient $\lambda_i$. The number of such beams to be selected is known a-priori. The RU 1210 may also transmit 2025 the indices of the selected one or more beams.

In other embodiments, the RU 1210 may select the one or more beams in an iterative approach, which means the RU 1210 selects a single beam from the set of beams in each loop. For example, the RU 1210 may initialize the channel as $H_{s,0}=H_s$ and set iteration index 1=0. The RU 1210 may calculate the projection coefficient for each beam as $$\mu_{l,i} = W_i^H H_{s,l},$$

where $W_i$ is the (normalized) weight vector of the $i^{th}$ pre-defined beam. The RU 1210 may determine the index $m_l$ of the strongest beam with the largest $|\mu_{l,m_l}|$ in the $l^{th}$ loop. Alternatively, this beam should also satisfy $$\frac{|\mu_{l,m_l}|}{|\mu_{0,m_0}|} > \epsilon,$$

where $\epsilon$ is a predefined threshold, for example, $-6$ dB. If the strongest beam does not satisfy this criterion then the beam selection procedure is finished. The RU 1210 may remove contribution of the selected one or more beams from channel data. For example, the RU 1210 may update the residual SRS channel: $H_{s,l+1}=H_{s,l}-\mu_{l,m_l}W_{m_l}$. The channel data can be obtained from the SRS signal. The RU 1210 may remove the selected beam from the candidate beams.

Alternatively or in addition, as stated above, the channel can comprise a subset of vertical channels and a subset of horizontal channels. The RU 1210 may select one or more vertical channels and one or more horizontal channels.

The RU 1210 compresses 2030 the signal by combing the beams based on the coefficients. In some embodiments, the channel can be compressed by the one or more beams. The processed channel $\tilde{H}_s$ can be represented as:

$$\tilde{H}_s \approx \sum_{i=0}^{N_0-1} \lambda_i W_i \text{ with } \tilde{H}_s \rightarrow H_s, \text{ as } N_0 \rightarrow N \tag{6}$$

where $N_0$ represents the number of selected beams, $\lambda_i$ represents the coefficient of the $i^{th}$ beam $W_i$ are the N beams weights each of dim: N×1, and $H_s$ is the N×1 channel. If the N beams are a subset of a set of beams comprising of many subsets, wherein the beams of the sub-set are orthogonal to each other and beams across subsets are non-orthogonal, then the subset of orthogonal beams that minimizes the mean squared estimation error between the channel $H_s$ and its approximation $\tilde{H}_s$ is chosen, i.e. min $$\{\|H_s - \tilde{H}_s\|^2\}.$$

Alternatively or in addition, as stated above, the channel can comprise a subset of vertical channels and a subset of horizontal channels. The RU 1210 may compress the vertical channels and the horizontal channels. For example, the horizontal channel can be expressed as:

$$\tilde{H}_h = \sum_{i=0}^{N_0^h} \lambda_i^h W_i^h, \tag{7}$$

where $$N_0^h$$

represents the number of horizontal channels, $$\lambda_i^h$$

represents the coefficient of the $i^{th}$ horizontal channel, $$W_i^h$$

are the $$N_0^h$$

horizontal channel weights each of dim:

$$N_0^h \times 1.$$

The vertical channel can be expressed as:

$$\tilde{H}_v = \sum_{i=0}^{N_0^v} \lambda_i^v W_i^v, \tag{8}$$

where $$N_0^v$$

represents the number of vertical channels, $$\lambda_i^v$$

represents the coefficient of the $i^{th}$ vertical channel, $$W_i^v$$

are the $$N_0^v$$

vertical channel weights each of dim:

$$N_0^v \times 1.$$

In this way, the number of beams is reduced.

$$\left(N_0^h + N_0^v\right) \le N_0 \le (N_h + N_v) \tag{9}$$

where $$N_0^h$$

represents the number of horizontal channels, $$N_0^v$$

represents the number of vertical channels, $N_0$ represents the number of selected beams, $N_h$ represents horizontal channels and $N_v$ represents the vertical channels. The best selection of $$N_0^h \text{ and } N_0^v$$

for a fixed $N_0$ the one which maximizes the power based on the following constrained optimization, $$\underset{N_0^h, N_0^v}{\max} \left\{ \left\| \tilde{V}_s^T\left(N_0^h, N_0^v\right)H_s \right\|^2 \right\} \text{ s.t } N_0^h + N_0^v \le N_0 \tag{10}$$

where, the overall Eigen-vector is $\tilde{V}_s = \mathrm{kron}(\tilde{V}_n, \tilde{V}_h)$, where $\mathrm{kron}(\ldots)$ is the Kronecker product. $\tilde{V}_h$ and $\tilde{V}_v$ are the dominant eigen vectors of the $\mathrm{Cov}(\tilde{H}_h)$ and $\mathrm{Cov}(\tilde{H}_v)$, where $\mathrm{Cov}(\ldots)$ is the covariance of the matrix.

The RU 1210 transmits 2035 the compressed signal and the indices of the selected beams to the BBU 1220. For example, the RU 12010 may transfer the compressed SRS channel $$\Lambda = \left[\lambda_{0,m_0}, \ldots, \lambda_{N_0-1,m_{N_0-1}}\right]^T = \left[W_{m_0}, \ldots, W_{m_{N_0-1}}\right]^H H_s$$

to the BBU 1200, as well as the indices $[m_0, \ldots, m_{N_0-1}]$ of the selected (strongest) beams. The BBU 1220 decompresses 2040 the signal based on the coefficients and the indices of the beams. In some embodiments, the transformation matrix T may be represented as:

$$T = \left[W_{m_0}, \ldots, W_{m_{N_0-1}}\right] \tag{11}$$

where $$W_{m_{N_0-1}}$$

represents the weight of the $m_{N_0-1}$ beam.

To decompress (that is, to recover the channel $\tilde{H}_s$ in antenna-space), the BBU 1220 may apply the inverse transformation. Since the transformation matrix T is typically a tall (i.e., rank deficient) matrix (because we are interested in the cases $N_0 < N$), it may employ its pseudo-inverse for the back-transformation, which is expressed as:

$$\tilde{H}_s = T(T^H T)^{-1}\Lambda \tag{12}$$

where $\Lambda$ is the beam-space channel, which can be represented as $\Lambda = T^H H_s$.

In some embodiments, the RU 1210 may also transmit information associated with the compression, the information comprising at least one of: indices of the one or more beams to the baseband unit, the compressed signal, a compressed channel, or the coefficients.

The BBU 1220 determines 2045 the channel estimation. For example, the BBU 1220 may compute the spatial co-variance matrix of the channel (represented as $\mathrm{Cov}(\tilde{H}_s)$). The BBU 1220 may perform eigen vector decomposition (EVD) on the co-variance matrix.

Alternatively or in addition, as stated above, the channel can comprise a subset of vertical channels and a subset of horizontal channels. The BBU 1220 may reconstruct $\tilde{H}_h$ and $\tilde{H}_v$ from the coefficient vectors $$\{\lambda_i^h\} \text{ and } \{\lambda_i^v\},$$

respectively. The BBU 120 may compute $\mathrm{Cov}(\tilde{H}_h)$ and $\mathrm{Cov}(\tilde{H}_v)$. The BBU 120 may perform EVD on $\mathrm{Cov}(\tilde{H}_h)$ and $\mathrm{Cov}(\tilde{H}_v)$ and obtain the dominant eigen vectors $\tilde{V}_h$ and $\tilde{V}_v$ for the horizontal and vertical directions.

Further, embodiments of the present disclosure can reduce the number of transmissions. The estimation on the channel is more accurate according to embodiments of the present disclosure.

Figure 4:
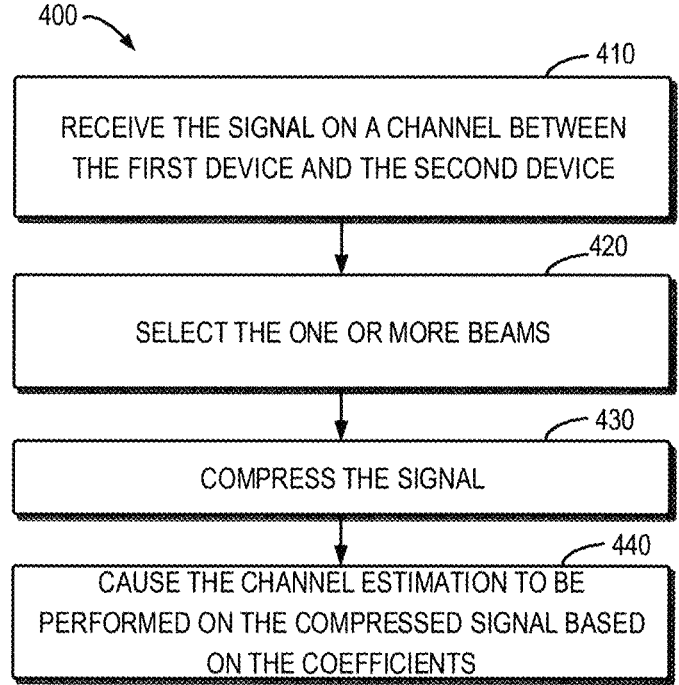
FIG. 4 illustrates a flow chart of a method implemented at a network device according to embodiments of the present disclosure.

FIG. 4 illustrates a flow chart of a method 400 in accordance with embodiments of the present disclosure. The method 400 may be implemented at any suitable devices. Only for the purpose of illustrations, the method 400 is described to be implemented at the RU 1210 in the network device 120.

At block 410, the RU 1210 receives the signal on the channel between the network device 120 and the terminal device 110-1. The channel can be expressed as a set of beams.

At block 420, the RU 1210 selects one or more beams from the set of beams associated with the channel. The linear combination of the selected one or more beams exceed a threshold value, which means the importance of the selected one or more beams is relatively high. Alternatively the RU selects a number of beams that have the highest value of the coefficient $\lambda_i$. The number of such beams to be selected is known a-priori.

In some embodiments, the BBU 1220 may obtain the indices of the beams from reference information, for example, reference signal receiving power (RSRP) information. The BBU 1220 may transmit 2010 the indices to the RU 1210. The RU 1210 may select 2020 the one or more beams based on the indices.

Alternatively or in addition, the RU 1210 may determine the coefficients to be used in the linear combination of the selected beams in the set of beams. Alternatively the RU selects a number of beams that have the highest value of the coefficient $\lambda_i$. If the coefficient exceeds a threshold coefficient, the RU select the beams. The RU 1210 may also transmit the indices of the selected one or more beams.

In other embodiments, the RU 1210 may select the one or more beams in an iterative approach, which means the RU 1210 selects a single beam from the set of beams in each loop. For example, the RU 1210 may determine a coefficient of at least one beam in the set of beams. The RU 1210 may select the beam with the highest coefficient and determine that the beam is one of the subset of beams. The RU 1210 may update the set of beams by removing the beam from the set of beams. If the highest coefficient in the left beams is below a threshold coefficient, the RU 1210 stops selection of the beams and the iterations.

Alternatively, or in addition, as stated above, the channel can comprise a subset of vertical channels and a subset of horizontal channels. The RU 1210 may select one or more vertical channels and one or more horizontal channels.

At block 430, the RU 1210 compresses the signal based on the coefficients of the beams. In some embodiments, the channel can be compressed by the one or more beams. Alternatively or in addition, as stated above, the channel can comprise a subset of vertical channels and a subset of horizontal channels. The RU 1210 may compress the vertical channels and the horizontal channels. In this way, the signal transmitted to the BBU 1220 is reduced, thereby saving the bandwidth.

At block 440, the RU 1210 causes the channel estimation to be performed based on the coefficients and the compressed signal. For example, the RU 1210 may transmit the coefficients to the BBU 1220. In some embodiments, the RU 1210 may also transmit the indices of the selected beams to the BBU 1220.

Figure 5:
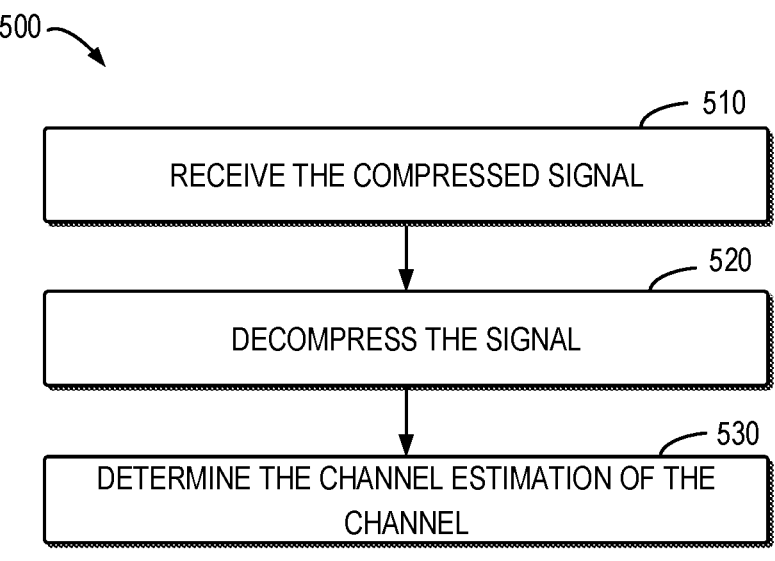
FIG. 5 illustrates a flow chart of a method implemented at a network device according to embodiments of the present disclosure.

FIG. 5 illustrates a flow chart of a method 500 in accordance with embodiments of the present disclosure. The method 500 may be implemented at any suitable devices. Only for the purpose of illustrations, the method 500 is described to be implemented at the BBU 1220 in the network device 120.

At block 510, the BBU 1220 receives the compressed signal from the RU 1210. In some embodiments, the BBU 120 may receive coefficients of beams from the RU 1210. In some embodiments, the BBU may obtain the indices of the beams from the indices of the beams from reference information, for example, reference signal receiving power (RSRP) information. The BBU 1220 may transmit the indices to the RU 1210. Alternatively or in addition, the BBU 1220 may receive the indices of the selected beams from the RU 1210.

At block 520, the BBU 1220 decompresses the compressed signal based on the coefficients. For example, the BBU may apply the inverse transformation to the signal.

At block 530, the BBU 1220 determines the channel estimation of the channel based on the signal. For example, the BBU 1220 may determine the channel estimation by performing the de-rotation using the signal. In some embodiments, the BBU 1220 may compute the spatial co-variance matrix of the channel (represented as $\text{Cov}(\tilde{H}_s)$). The BBU 1220 may perform eigen vector decomposition (EVD) on the co-variance matrix.

Alternatively or in addition, as stated above, the channel can comprise a subset of vertical channels and a subset of horizontal channels. The BBU 1220 may reconstruct $\tilde{H}_h$ and $\tilde{H}_v$ from the coefficient vectors $$\{\lambda_i^h\} \text{ and } \{\lambda_i^v\},$$

respectively. The BBU 120 may compute $\text{Cov}(\tilde{H}_h)$ and $\text{Cov}(\tilde{H}_v)$. The BBU 120 may perform EVD on $\text{Cov}(\tilde{H}_h)$ and $\text{Cov}(\tilde{H}_v)$ and obtain the dominant eigen vectors $\tilde{V}_h$ and $\tilde{V}_v$ for the horizontal and vertical directions.

FIGS. 6-12 illustrate comparison results between conventional technologies and the present disclosure. In the comparison, 8*8*2 antenna panel and 4*8*2 antenna panel are taken as examples. The "8*8*2" represents 8 vertical antenna elements, 8 horizontal antenna elements and 2 panels. The "4*8*2" represents 4 vertical antenna elements, 8 horizontal antenna elements and 2 panels. For 8*8*2 panel, $N_0$ is varied from 1 to 64. For 4*8*2 panel, $N_0$ is varied from 1 to 32. Power Ratio here refers to $$\frac{\left\|\tilde{V}_s^T H_s\right\|^2}{\left\|V_s^T H_s\right\|^2},$$

where $\tilde{V}_s$ is N×1 eigen vector associated with the dominant eigen mode of $\tilde{H}_s$. It should be noted that the number of vertical and horizontal antenna elements are only examples not limitations.

Figure 6:
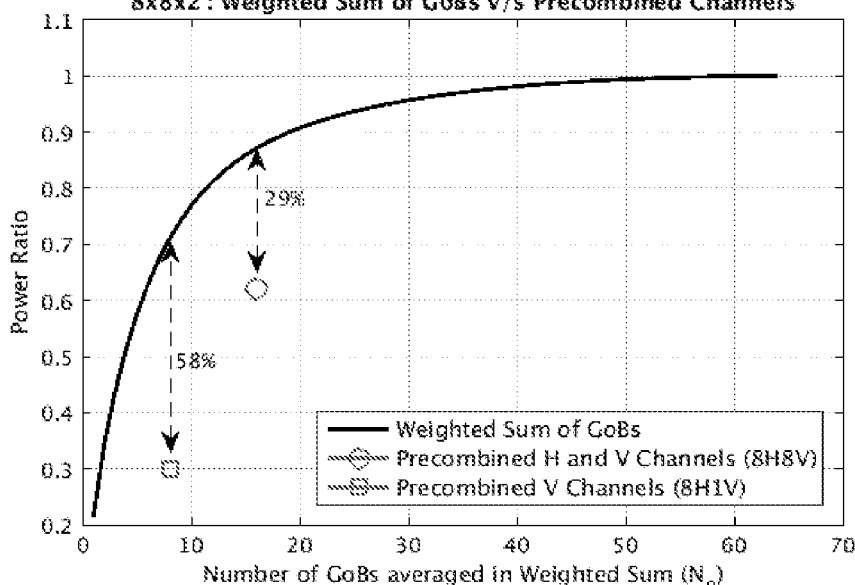
FIGS. 6 to 12 illustrate comparison results between conventional technologies and the present disclosure, respectively.
Figure 7:
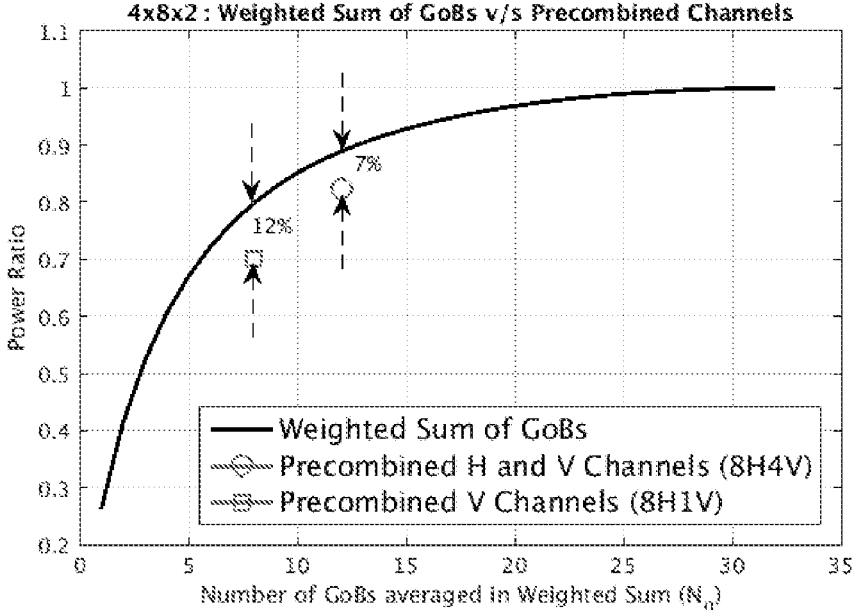

FIGS. 6 and 7 depict the power ratio (ratio of the received power from using the approximated channel v/s the actual channel) as a function of the number of beams used in the weighted sum. It has also plotted the power ratio achievable power with the pre-combining method, i.e., $$\left(\frac{\left\|V_{Prec}^T H_s\right\|^2}{\left\|V_s^T H_s\right\|^2}\right)$$

for an equivalent overhead of the number of beams used in the weighted sum. It is evident that the power ratio achievable with the weighted sum of beams approach when compared to the pre-combining method is significant. Also, it can be seen that the smaller the ratio of $$\frac{N_0}{N},$$

the larger the gain with the weighted sum of beams approach.

The Normalized Mean Square Error (NMSE) can be determined as $$NMSE = E\left\{\frac{\left\|H_s - \tilde{H}_s\right\|^2}{\|H_s\|^2}\right\} \tag{13}$$

where $H_s$ represents the channel, $\tilde{H}_s$ represents the processed channel, represents the operation of NMESE.

Figure 8:
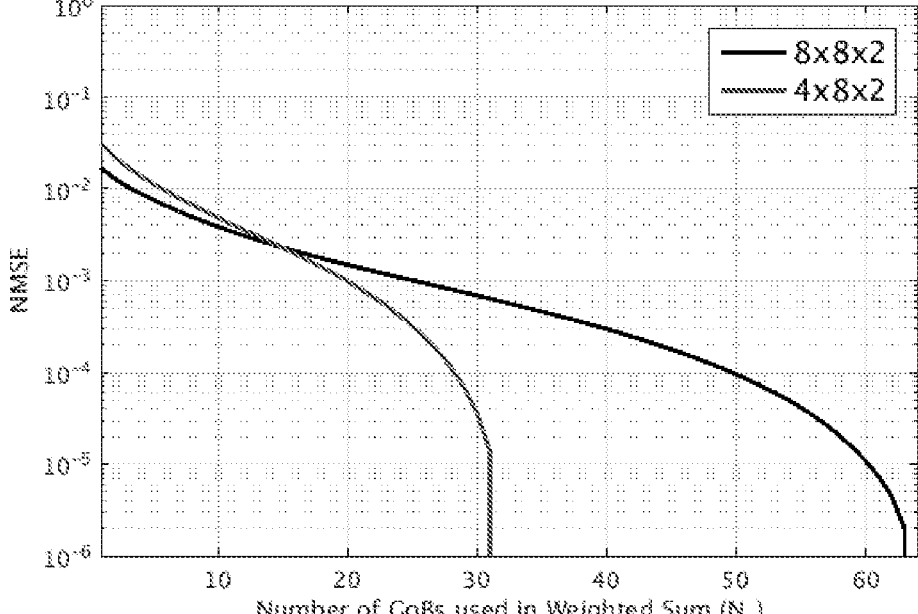

In FIG. 8, the NMSE $<5\times10^{-3}$ when the number of beams used in the weighted sum exceeds 10. This is far lesser than the total number of TRXs which is 64 (for 8*8*2) and 32 (for 4*8*2). The channel is estimated accurately based on the selected beams and their weights.

Figure 9:
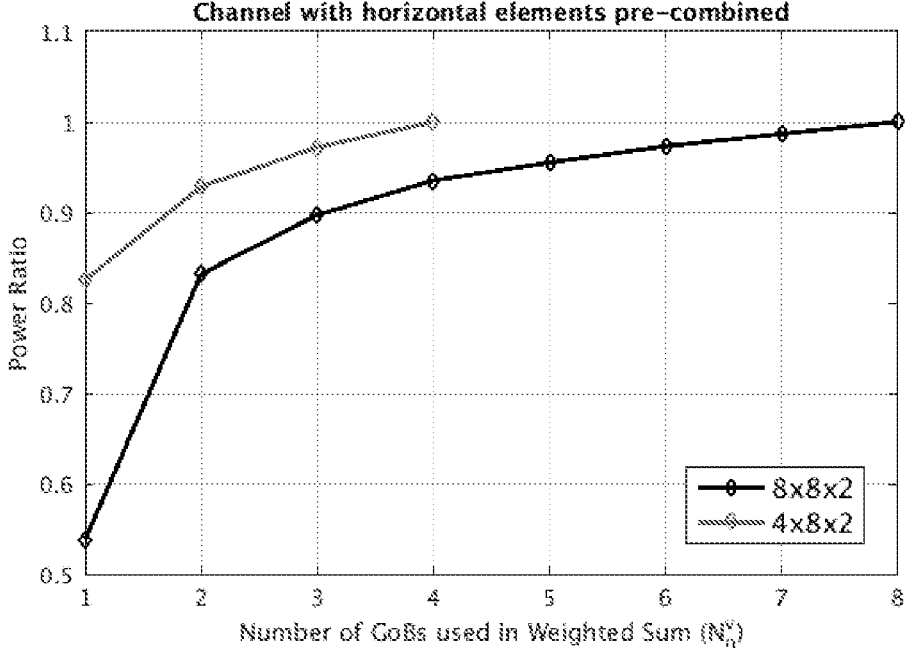
Figure 10:
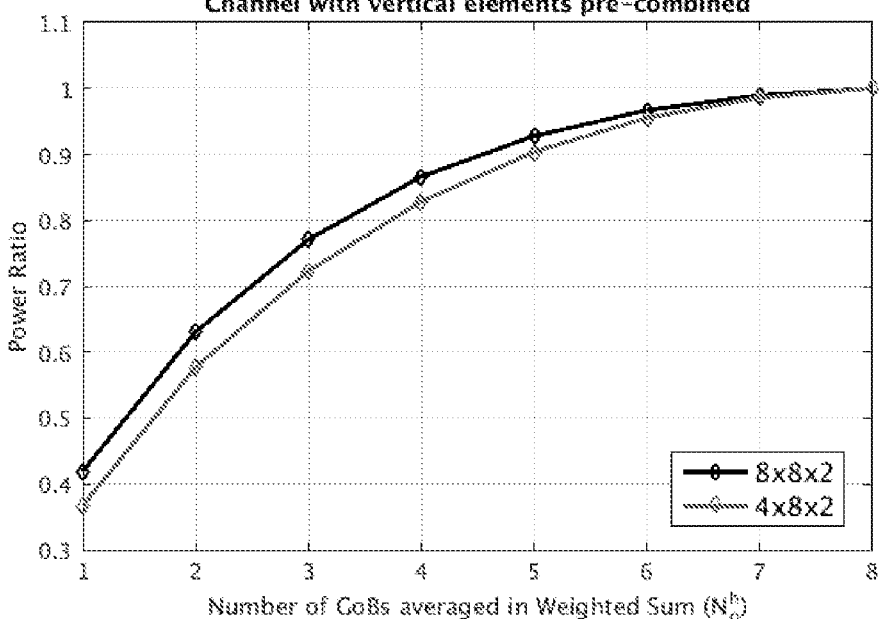

FIGS. 9 and 10 show the Power ratio of the V and H pre-combined channels expressed as weighted sum of beams, respectively. The power ratio is a function of the number of beams. It can be seen that number of beams needed to closely approximate the vertical channel is less compared to the number of beams needed to closely approximate the horizontal channel. For the V channel in FIG. 9, the power ratio is quite high (approximately 90% in this example) or even more when $$N_0^v \geq 3.$$

Similarly, for the H channel in FIG. 10, the square root of the power ratio is quite high (approximately 90% in this example) or even more when $$N_0^h \geq 5.$$

Hence information conveyed using $$\left(N_0^h + N_0^v\right) = 8$$

samples with the present disclosure can closely approximate the performance conveyed by the method that uses only pre-combination. This helps in reducing the number of transmissions in the delay managed configuration. It should be noted that number of antenna elements and the percentage are only examples not limitations.

Figure 11:
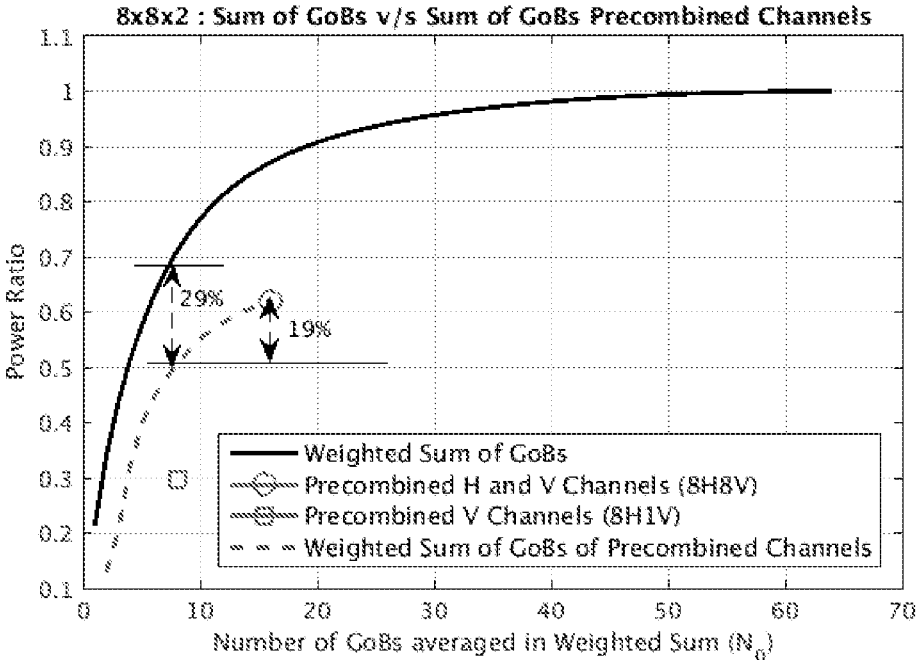
Figure 12:
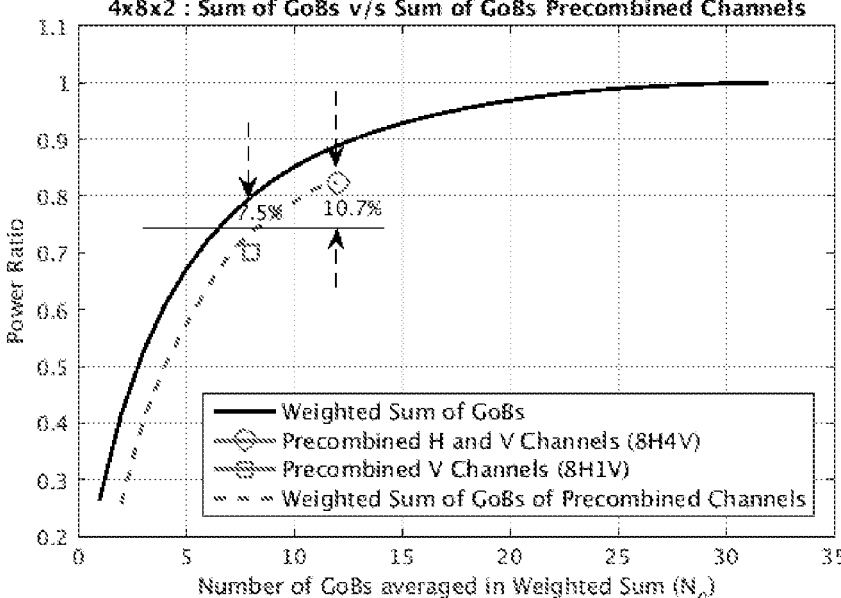

FIGS. 11 and 12 show the power ratio $$\left( \frac{\left\| \hat{V}_s^T H_s \right\|^2}{\left\| V_s^T H_s \right\|^2} \right)$$

achieved by the weighted sum of pre-combined channels by best combination of $$\left(N_0^h, N_0^v\right)$$

following the optimization rule in (10) for various values of $N_0$. This is also benchmarked with the achievable power ratio with pre-combining before EBF weights determination $$\left( \frac{\left\| V_{Prec}^T H_s \right\|^2}{\left\| V_s^T H_s \right\|^2} \right)$$

with an equivalent overhead compared to the number of beams. For 8*8*2, for the 8H1V case, the performance loss when compared to transferring the full channel is reduced from more than fifty percent with the legacy pre-combining approach to less than thirty percent using embodiments of the present disclosure. For 4*8*2, for the 8H1V case, the performance loss is reduced using embodiments of the present disclosure, for the same transport overhead between the RU and the BBU. It should be noted that number of antenna elements and the percentage are only examples not limitations.

In some embodiments, an apparatus for performing the method 400 (for example, the network device 120) may comprise respective means for performing the corresponding steps in the method 400. These means may be implemented in any suitable manners. For example, it can be implemented by circuitry or software modules.

In some embodiments, the apparatus comprises means for receiving, at a radio unit, a signal on a channel between a first device and a second device, the radio unit being in the first device; means for selecting one or more beams from a set of beams associated with the channel in accordance with coefficients of beams, the coefficients indicating importance of the beams and being used for combining the selected one or more beams; means for compressing the signal based on the coefficients; and means for causing a channel estimation to be performed on the compressed signal based on the coefficients.

In some embodiments, the means for selecting one or more beams comprises: means for obtaining indices of the one or more beams from the baseband unit; and means for determining the one or more beams based on the indices.

In some embodiments, the means for selecting one or more beams comprises: means for determining a weight of one beam in the set of beams; and means for in accordance with the coefficient being higher than a threshold value or being of higher than coefficients associated with other beams, determining the beam to be one of the one or more beam.

In some embodiments, the means for selecting one or more beams comprises: means for iteratively performing the following one or more until the highest coefficient is less than a threshold value: determining a coefficient of at least one beam in the set of beams; selecting the beam with the highest coefficient; determining the beam to be one of the one or more of beams; means for removing contribution of the selected one or more beams from channel data; and updating the set of beams by removing the beam from the set of beams.

In some embodiments, the means for selecting one or more beams comprises: means for selecting a first subset of beams in a vertical direction based on maximization of power of the signal; and means for selecting a second subset of beams in a horizontal direction based on maximization of power of the signal.

In some embodiments, the apparatus comprises means for transmitting information associated with the compression, the information comprising at least one of: indices of the one or more beams to the baseband unit, the compressed signal, a compressed channel, or the coefficients.

In some embodiments, the means for selecting the one or more beams from a set of beams comprises means for selecting one or more beams from a set of beams associated with the channel such that the coefficients exceed a threshold value.

embodiments, the means for selecting the one or more beams from a set of beams comprises means for selecting one or more beams from a set of beams associated with the channel such that a predetermined number of coefficients are used to compress the signal.

In some embodiments, an apparatus for performing the method 500 (for example, the network device 120) may comprise respective means for performing the corresponding steps in the method 500. These means may be implemented in any suitable manners. For example, it can be implemented by circuitry or software modules.

In some embodiments, the apparatus comprises means for receiving, at a baseband unit in a first device and from a radio unit in the first device, a compressed signal and indices of one or more beams, the compressed signal being obtained from a signal received on a channel between the first device and a second further device, the one or more beams associated with the channel; means for decompressing the compressed signal based on coefficient for combining the one or more beams, the coefficients indicating importance of the one or more beams; and means for determining a channel estimation of the channel between the first device and the second device based on the signal.

In some embodiments, the means for determining the channel estimation of the channel comprises: means for determining the channel estimation of the channel by performing a de-rotation with the signal.

In some embodiments, the apparatus further comprises means for obtaining indices of the one or more beams from channel reference information; and means for transmitting an indication concerning the indices to the radio unit.

Figure 13:
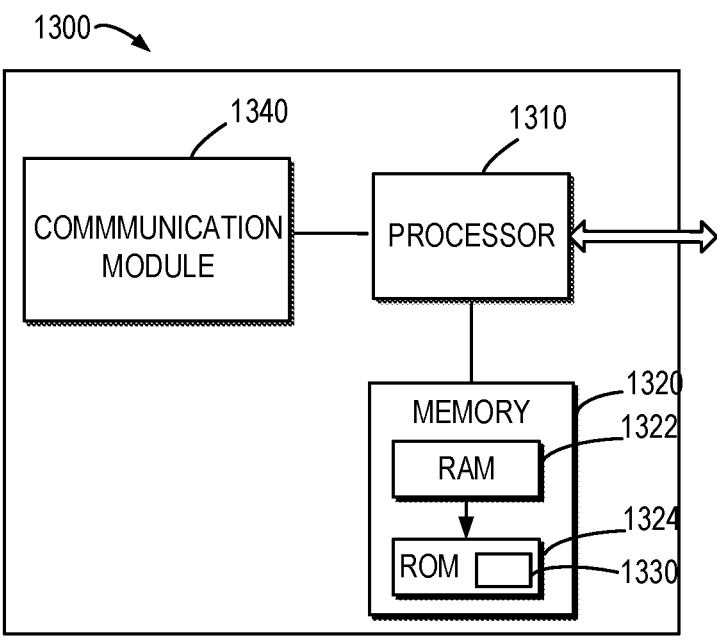
FIG. 13 illustrates a schematic diagram of a device according to embodiments of the present disclosure.

FIG. 13 is a simplified block diagram of a device 1300 that is suitable for implementing embodiments of the present disclosure. The device 1300 may be provided to implement the communication device, for example the network device 120 or the terminal devices 110 as shown in FIG. 1. As shown, the device 1300 includes one or more processors 1310, one or more memories 1320 coupled to the processor 1310, and one or more communication module (for example, transmitters and/or receivers (TX/RX)) 1340 coupled to the processor 1310.

The communication module 1340 is for bidirectional communications. The communication module 1340 has at least one antenna to facilitate communication. The communication interface may represent any interface that is necessary for communication with other network elements.

The processor 1310 may be of any type suitable to the local technical network and may include one or more of the following: general purpose computers, special purpose computers, microprocessors, digital signal processors (DSPs) and processors based on multicore processor architecture, as non-limiting examples. The device 1300 may have multiple processors, such as an application specific integrated circuit chip that is slaved in time to a clock which synchronizes the main processor.

The memory 1320 may include one or more non-volatile memories and one or more volatile memories. Examples of the non-volatile memories include, but are not limited to, a Read Only Memory (ROM) 1324, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 1322 and other volatile memories that will not last in the power-down duration.

A computer program 1330 includes computer executable instructions that are executed by the associated processor 1310. The program 1330 may be stored in the ROM 1324. The processor 1310 may perform any suitable actions and processing by loading the program 1330 into the RAM 1322.

The embodiments of the present disclosure may be implemented by means of the program 1330 so that the device 1300 may perform any process of the disclosure as discussed with reference to FIGS. 2, 4 and 5. The embodiments of the present disclosure may also be implemented by hardware or by a combination of software and hardware.

Figure 14:
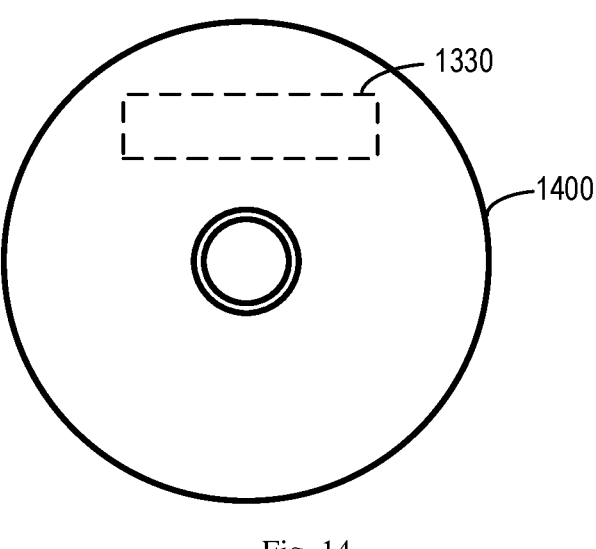
FIG. 14 shows a block diagram of an example computer readable medium in accordance with some embodiments of the present disclosure.

In some embodiments, the program 1330 may be tangibly contained in a computer readable medium which may be included in the device 1300 (such as in the memory 1320) or other storage devices that are accessible by the device 1300. The device 1300 may load the program 1330 from the computer readable medium to the RAM 1322 for execution. The computer readable medium may include any types of tangible non-volatile storage, such as ROM, EPROM, a flash memory, a hard disk, CD, DVD, and the like. FIG. 14 shows an example of the computer readable medium 1400 in form of CD or DVD. The computer readable medium has the program 1330 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof The present disclosure also provides at least one computer program product tangibly stored on a non-transitory computer readable storage medium. The computer program product includes computer-executable instructions, such as those included in program modules, being executed in a device on a target real or virtual processor, to carry out the methods 400 and 600 as described above with reference to FIGS. 2-5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A radio unit comprising:
at least one processor; and
at least one memory including computer program codes;
the at least one memory and the computer program codes are configured to, with the at least one processor, cause the radio unit to:
receive a signal on a channel between a first device and a second device, the radio unit being in the first device;
select one or more beams from a set of beams associated with the channel in accordance with coefficients of beams, the coefficients indicating importance of the beams and being used for combining the selected one or more beams;
compress the signal based on the coefficients; and
cause a channel estimation to be performed on the compressed signal based on the coefficients,
wherein the radio unit is caused to select one or more beams by:
iteratively performing the following until the highest coefficient is less than a threshold value:
determining a coefficient of at least one beam in the set of beams;
selecting the beam with the highest coefficient;
determining the beam to be one of the one or more beams:
removing contribution of the selected one or more beams from channel data; and
updating the set of beams by removing the beam from the set of beams.

2. The radio unit of claim 1, wherein the radio unit is caused to select one or more beams by:
obtaining indices of the one or more beams from a baseband unit; and
determining the one or more beams based on the indices.

3. The radio unit of claim 1, wherein the radio unit is caused to select one or more beams by:
determining a coefficient associated with one beam in the set of beams; and
in accordance with the coefficient being higher than a threshold value or being of higher than coefficients associated with other beams, determining the beam to be one of the one or more beams.

4. The radio unit of claim 1, wherein the radio unit is caused to select one or more beams by:

selecting a first subset of beams in a vertical direction based on maximization of power of the signal; and
selecting a second subset of beams in a horizontal direction based on maximization of power of the signal.

5. The radio unit of claim 1, wherein the radio unit is further caused to:
transmit information associated with the compression, the information comprising at least one of:
indices of the one or more beams to a baseband unit,
the compressed signal,
a compressed channel, or
the coefficients.

6. The radio unit of claim 1, wherein the radio unit is caused to select one or more beams from a set of beams by:
selecting one or more beams from a set of beams associated with the channel such that the coefficients exceed a threshold value.

7. The radio unit of claim 1, wherein the radio unit is caused to select one or more beams from a set of beams by:
selecting one or more beams from a set of beams associated with the channel such that a predetermined number of coefficients are used to compress the signal.

8. A baseband unit comprising:
at least one processor; and
at least one memory including computer program codes;
the at least one memory and the computer program codes are configured to, with the at least one processor, cause the baseband unit to:
receive, from a radio unit in a first device, a compressed signal and indices of one or more beams, the compressed signal being obtained from a signal received on a channel between the first device and a second further device, the one or more beams associated with the channel and having been selected by the radio unit by iteratively performing the following until the highest coefficient is less than a threshold value:
determining a coefficient of at least one beam in the set of beams, selecting the beam with the highest coefficient, determining the beam to be one of the one or more beams, removing contribution of the selected one or more beams from channel data, and updating the set of beams by removing the beam from the set of beams, the baseband unit being in the first device;
decompress the compressed signal based on coefficient for combining the one or more beams, the coefficients indicating importance of the one or more beams; and
determine a channel estimation of the channel between the first device and the second device based on the signal.

9. The baseband unit of claim 8, wherein the baseband unit is caused to determine the channel estimation of the channel by:
determining the channel estimation of the channel by performing a de-rotation with the signal.

10. The baseband unit of claim 8, wherein the baseband unit is further caused to:
obtain indices of the one or more beams from channel reference information; and
transmit an indication concerning the indices to the radio unit.

11. A method comprising:
receiving, at a radio unit, a signal on a channel between a first device and a second device, the radio unit being in the first device;
selecting one or more beams from a set of beams associated with the channel in accordance with coefficients of beams, the coefficients indicating importance of the beams and being used for combining the selected one or more beams;

compressing the signal based on the coefficients; and causing a channel estimation to be performed on the compressed signal based on the coefficients, wherein selecting one or more beams comprises:

iteratively performing the following until the highest coefficient is less than a threshold value:

determining a coefficient of at least one beam in the set of beams;

selecting the beam with the highest coefficient;

determining the beam to be one of the one or more of beams;

removing contribution of the selected one beam from channel data; and updating the set of beams by removing the beam from the set of beams.

12. The method of claim 11, wherein selecting one or more beams comprises:

obtaining indices of the one or more beams from a baseband unit; and determining the one or more beams based on the indices.

13. The method of claim 11, wherein selecting one or more beams comprises:

determining a weight of one beam in the set of beams; and in accordance with the coefficient being higher than a threshold value or being of higher than coefficients associated with other beams, determining the beam to be one of the one or more beam.

14. The method of claim 11, wherein selecting one or more beams comprises:

selecting a first subset of beams in a vertical direction based on maximization of power of the signal; and selecting a second subset of beams in a horizontal direction based on maximization of power of the signal.

15. The method of claim 11, further comprising:

transmitting information associated with the compression, the information comprising at least one of:

indices of the one or more beams to a baseband unit, the compressed signal, a compressed channel, or the coefficients.

16. The method of claim 11, wherein selecting the one or more beams from a set of beams by:

selecting one or more beams from a set of beams associated with the channel such that the coefficients exceed a threshold value.

17. The method of claim 11, wherein selecting the one or more beams from a set of beams by:

selecting one or more beams from a set of beams associated with the channel such that a predetermined number of coefficients are used to compress the signal.

18. A method comprising:

receiving, at a baseband unit in a first device and from a radio unit in the first device, a compressed signal and indices of one or more beams, the compressed signal being obtained from a signal received on a channel between the first device and a second further device, the one or more beams associated with the channel and having been selected by the radio unit by iteratively performing the following until the highest coefficient is less than a threshold value: determining a coefficient of at least one beam in the set of beams, selecting the beam with the highest coefficient, determining the beam to be one of the one or more beams, removing contribution of the selected one or more beams from channel data, and updating the set of beams by removing the beam from the set of beams, decompressing the compressed signal based on coefficient for combining the one or more beams, the coefficients indicating importance of the one or more beams; and determining a channel estimation of the channel between the first device and the second device based on the signal.

19. The method of claim 18, wherein determining the channel estimation of the channel comprises:

determining the channel estimation of the channel by performing a de-rotation with the signal.

20. The method of claim 18, further comprising:

obtaining indices of the one or more beams from channel reference information; and transmitting an indication concerning the indices to the radio unit.

21. An apparatus comprising circuitry configured to cause the apparatus to perform a method according to claim 11.

22. A non-transitory computer readable medium storing instructions thereon, the instructions, when executed by at least one processing unit of a machine, causing the machine to perform a method according to claim 11.

* * * * *